United States Patent [19]
Satoh et al.

[11] Patent Number: 5,990,029
[45] Date of Patent: Nov. 23, 1999

[54] HIGH DIELECTRIC-CONSTANT DIELECTRIC CERAMIC COMPOSITION, AND ITS FABRICATION PROCESS

[75] Inventors: Masami Satoh; Hitoshi Tanaka, both of Akita, Japan

[73] Assignee: TDK Corporation, Tokyo, Japan

[21] Appl. No.: 09/028,642

[22] Filed: Feb. 24, 1998

[30] Foreign Application Priority Data

Feb. 25, 1997 [JP] Japan ................................. 9-040465

[51] Int. Cl.$^6$ .................................................. C04B 35/468
[52] U.S. Cl. ........................................... 501/138; 501/139
[58] Field of Search ................................... 501/137, 138, 501/139

[56] References Cited

U.S. PATENT DOCUMENTS

| | | | |
|---|---|---|---|
| 4,803,591 | 2/1989 | Miyashita et al. | 501/138 |
| 5,084,424 | 1/1992 | Abe et al. | 501/138 |
| 5,238,887 | 8/1993 | Kato et al. | 501/138 |
| 5,250,481 | 10/1993 | Park | 501/138 |
| 5,296,426 | 3/1994 | Burn | 501/138 |

FOREIGN PATENT DOCUMENTS

| | | |
|---|---|---|
| 61-20084 | 5/1986 | Japan . |
| 3-146466 | 6/1991 | Japan . |
| 4-292458 | 10/1992 | Japan . |
| 4-292459 | 10/1992 | Japan . |
| 4-295048 | 10/1992 | Japan . |
| 5-109319 | 4/1993 | Japan . |
| 6-243721 | 9/1994 | Japan . |

*Primary Examiner*—Karl Group
*Attorney, Agent, or Firm*—Oblon, Spivak, McClelland, Maier & Neustadt, P.C.

[57] ABSTRACT

A dielectric ceramic composition of the invention comprises as major components 94 to 99 mol % of barium titanate, calculated as $BaTiO_3$, 0.05 to 3 mol % of tantalum oxide, calculated as $Ta_2O_5$, 0.05 to 3 mol % of niobium oxide, calculated as $Nb_2O_5$, and 0.5 to 3 mol % of zinc oxide, calculated as $ZnO$, and further contains as a subordinate additive at least one of calcium zirconate, strontium zirconate and barium zirconate in a total amount of 0.2 to 5% by weight per 100 mol % of said major components, calculated as $CaZrO_3$, $SrZrO_3$ and $BaZrO_3$, respectively. The dielectric ceramic composition having a high dielectric constant is most unlikely to delaminate and is suitable for a multilayered ceramic capacitor. This dielectric ceramic composition has also little, if any, capacitance change and dielectric loss over a wide temperature range of −55° C. to +150° C.

18 Claims, 1 Drawing Sheet

5,990,029

HIGH DIELECTRIC-CONSTANT DIELECTRIC CERAMIC COMPOSITION, AND ITS FABRICATION PROCESS

BACKGROUND OF THE INVENTION

The present invention relates generally to a high dielectric-constant dielectric ceramic composition and its fabrication process, and more particularly to a high dielectric-constant dielectric ceramic composition, which is suitable for multilayered ceramic capacitors, and has little, if any, capacitance change and dielectric loss over a wide temperature range (−55° C. to +150° C.) and its fabrication process.

Currently available capacitors, for the most part, are multilayered capacitors that are obtained by the thermocompression bonding and co-firing of a stack comprising alternately interleaved starting dielectric sheets and electrodes. These capacitors, albeit being reduced in size, achieve larger capacities than would be possible with conventional simple plate type capacitors. To achieve size reductions and capacity increases, it is essentially required to use high dielectric-constant materials and make dielectric layers thin.

So far, dielectric ceramic compositions comprising barium titanate ($BaTiO_3$), and a bismuth compound such as $Bi_2O_3 \cdot 2SnO_2$ or $Bi_2O_3 \cdot 2ZrO_2$, and $Ta_2O_5$, $Sm_2O_3$, $Nb_2O_5$ or the like added thereto have been used as those having a high dielectric constant and showing a reduced rate of dielectric constant change with temperature.

When the dielectric ceramic compositions comprising such ingredients have an increased dielectric constant, however, they cannot be practically used because of an increase in the rate of capacitance change with temperature. With these compositions, it is thus difficult to obtain a multilayered ceramic capacitor of small size yet of large capacity. A capacitor, even when it is somehow obtained with such compositions, barely satisfies the X7R standard (providing that the rate of capacitance change is within ±15% of a reference value at 25° C. over the temperature range of −55° C. and +125° C.) prescribed by EIAJ (the Standards of Electronic Industries Association of Japan), and has some considerable dielectric loss (tan δ) as well. Thus, the aforesaid dielectric ceramic compositions are unsuitable for multilayered ceramic capacitors.

A problem with the incorporation of a bismuth compound in a dielectric ceramic composition is that the bismuth ingredient evaporates off upon firing, resulting in the bending of the ceramic composition material or the generation of pinholes therein. This makes it difficult to obtain a dense ceramic composition.

When a multilayered capacitor is built up of barium titanate containing a bismuth compound, palladium or a silver-palladium alloy forming an internal electrode reacts with bismuth that is one component of the dielectric material, and so the internal electrode loses its own function. For this reason, costly noble metals such as platinum, and platinum-palladium alloys, which are unlikely to react with bismuth, must be used for the internal electrode. This is one leading cause for the cost rise of multilayered ceramic capacitors.

To provide a solution to such problems as mentioned above, bismuth compound-free dielectric ceramic compositions with a high dielectric constant have already been disclosed. Some of these compositions are found to be lower in the rate of capacitance change with temperature than bismuth compound-containing compositions.

For instance, JP-A's 4-292458, 4-292459 and 4-295048 disclose high dielectric-constant dielectric ceramic compositions, which contain as major components 94.0 to 99.0 mol % of $BaTiO_3$, 0.5 to 3.0 mol % of $Nb_2O_5$ and 0.5 to 3.0 mol % of CoO, and as a subordinate additive 0.2 to 7.0% by weight of at least one of $BaTiO_3$, $SrZrO_3$ and $BaZrO_3$. However, these compositions fail to satisfy the X8R standard (providing that the rate of capacitance change is within ±15% of a reference value at 25° C. over the temperature range of −55° C. to +150° C.) prescribed by EIAJ (the Standards of Electronic Industries Association of Japan). While some compositions may somehow satisfy this standard, they are still unsuitable for multilayered ceramic capacitors because of their large dielectric loss (tan δ). Upon formed into multilayered ceramic capacitors, they satisfy the X8R standard only in a very narrow temperature range of 1,280 to 1,320° C. because their rates of capacitance change with temperature is largely dependent on firing temperature.

JP-A 5-109319 discloses high dielectric-constant dielectric ceramic compositions, which contain as major components 94.0 to 99.0 mol % of $BaTiO_3$, 0.5 to 3.0 mol % of $Ta_2O_5$ and 0.5 to 3.0 mol % of ZnO, and as a subordinate additive 0.2 to 7.0% by weight of $CaZrO_3$. However, these compositions have a reduced insulating property, and a low relative dielectric constant as well. In addition, they fail to satisfy the X8R standard prescribed by EIAJ. Some of the compositions may possibly meet this standard, but they are still unsuitable for multilayered ceramic capacitors because their dielectric loss (tan δ) is unacceptably large. Furthermore, they must be fired at an elevated temperature for the formation of a multilayered ceramic capacitor, and are poor in sinterability as well.

JP-A 6-243721 discloses high dielectric-constant dielectric ceramic compositions, which contain as major components 94.0 to 99.0 mol % of $BaTiO_3$, 0.5 to 3.0 mol % of $Nb_2O_5$ and 0.5 to 3.0 mol % of ZnO, and as a subordinate additive 0.2 to 7.0% by weight of at least one of $CaZrO_3$, $SrZrO_3$ and $BaZrO_3$. However, these compositions again fail to meet the X8R standard prescribed by EIAJ. Some of them may possibly satisfy this standard, but they are still unsuitable for multilayered ceramic capacitors because their dielectric loss (tan δ) is unacceptably large. Upon formed into multilayered ceramic capacitors, they may somehow satisfy the X8R standard only in a very narrow temperature range of 1,280 to 1,320° C. because their rates of capacitance change with temperature is largely dependent on firing temperature, as will be appreciated from the examples given later.

Never until now, as mentioned above, is there obtained a high dielectric-constant dielectric ceramic composition, which is suitable for a multilayered ceramic capacitor and has little, if any, capacitance change and dielectric loss over a wide temperature range of −55° C. to +150° C.

Thus, it is an object of the present invention to provide a high dielectric-constant dielectric ceramic composition, which is most unlikely to delaminate and so suitable for a multilayered ceramic capacitor, and has little, if any, capacitance change and dielectric loss over a wide temperature range of −55° C. to +150° C.

SUMMARY OF THE INVENTION

According to the present invention, the aforesaid object is accomplished as mentioned below.

(1) A high dielectric-constant dielectric ceramic composition, which comprises as major components 94 to 99 mol % of barium titanate, calculated as $BaTiO_3$, 0.05 to 3 mol % of tantalum oxide, calculated as $Ta_2O_5$, 0.05 to 3 mol % of niobium oxide, calculated as $Nb_2O_5$, and 0.5 to 3 mol % of zinc oxide, calculated as ZnO, and further contains as a subordinate additive at least one of calcium zirconate, strontium zirconate and barium zirconate in a total amount of 0.2 to 5% by weight per 100 mol % of said major components, calculated as $CaZrO_3$, $SrZrO_3$ and $BaZrO_3$, respectively.

(2) The high dielectric-constant dielectric ceramic composition of (1), which further contains at least one of lanthanum oxide, neodymium oxide, praseodymium oxide and samarium oxide in a total amount of up to 0.7% by weight per 100 mol % of said major components, calculated as $La_2O_3$, $Nd_2O_3$, $Pr_6O_{11}$ and $Sm_2O_3$, respectively.

(3) The high dielectric-constant dielectric ceramic composition of (1) or (2), which further contains manganese oxide in an amount of up to 0.3% by weight per 100 mol % of said major components, calculated as MnO.

(4) The high dielectric-constant dielectric ceramic composition of any one of (1) to (3), which further contains silicon oxide in an amount of up to 0.3% by weight per 100 mol % of said major components, calculated as $SiO_2$.

(5) The high dielectric-constant dielectric ceramic composition of any one of (1) to (4), wherein a capacitance change thereof with temperature is within ±15% of a reference value at 25° C. over a temperature range of −55° C. to +150° c.

(6) A process of fabricating a high dielectric-constant dielectric ceramic composition as recited in any one of (1) to (5), wherein $BaTiO_3$ having an average particle diameter of 0.4 to 1.5 μm is used as a raw material.

(7) A process of fabricating a high dielectric-constant dielectric ceramic composition as recited in any one of (1) to (5), wherein $BaTiO_3$ having a purity of at least 99.5% is used as a raw material.

(8) A process of fabricating a high dielectric-constant dielectric ceramic composition as recited in any one of (1) to (5), wherein $BaTiO_3$ having an average particle diameter of 0.4 to 1.5 μm and a purity of at least 99.5% is used as a raw material.

The high dielectric-constant dielectric ceramic composition of the invention has excellent properties as represented by a high normal-temperature relative dielectric constant of 2,500 or more and especially 3,000 to 4,500, a low dielectric loss factor (tan δ) of 1.2% at most, and a capacitance change with temperature that satisfies the X8R standard (providing that the capacitance change is within ±15% of a reference value at 25° C. over the temperature range of −55° C. to +150° C.) prescribed by EIAJ (the Standards of Electronic Industries Association of Japan). In addition, the present composition can satisfy the X8R standard over a wide firing temperature range of 1,280 to 1,380° C. because its rate of capacitance change with temperature is less dependent on firing temperature.

The dielectric ceramic composition of the invention is also suitable for a multilayered ceramic capacitor because of being most unlikely to delaminate upon firing. In addition, this composition can be used to fabricate an inexpensive multilayered ceramic capacitor and so has great industrial merits because palladium, silver-palladium alloys, silver, etc. can be used for an internal electrode due to the absence of any bismuth compound.

By limiting the average particle diameter of the raw material barium titanate ($BaTiO_3$) to the range of 0.4 to 1.5 μm, it is also possible to fabricate a high-quality multilayered ceramic capacitor that has not undergone delamination upon firing.

BRIEF DESCRIPTION OF THE DRAWING

These and other features of the invention will be apparent with reference to the following description and a single drawing.

DETAILED EXPLANATION OF THE PREFERRED EMBODIMENTS

Figure 1:
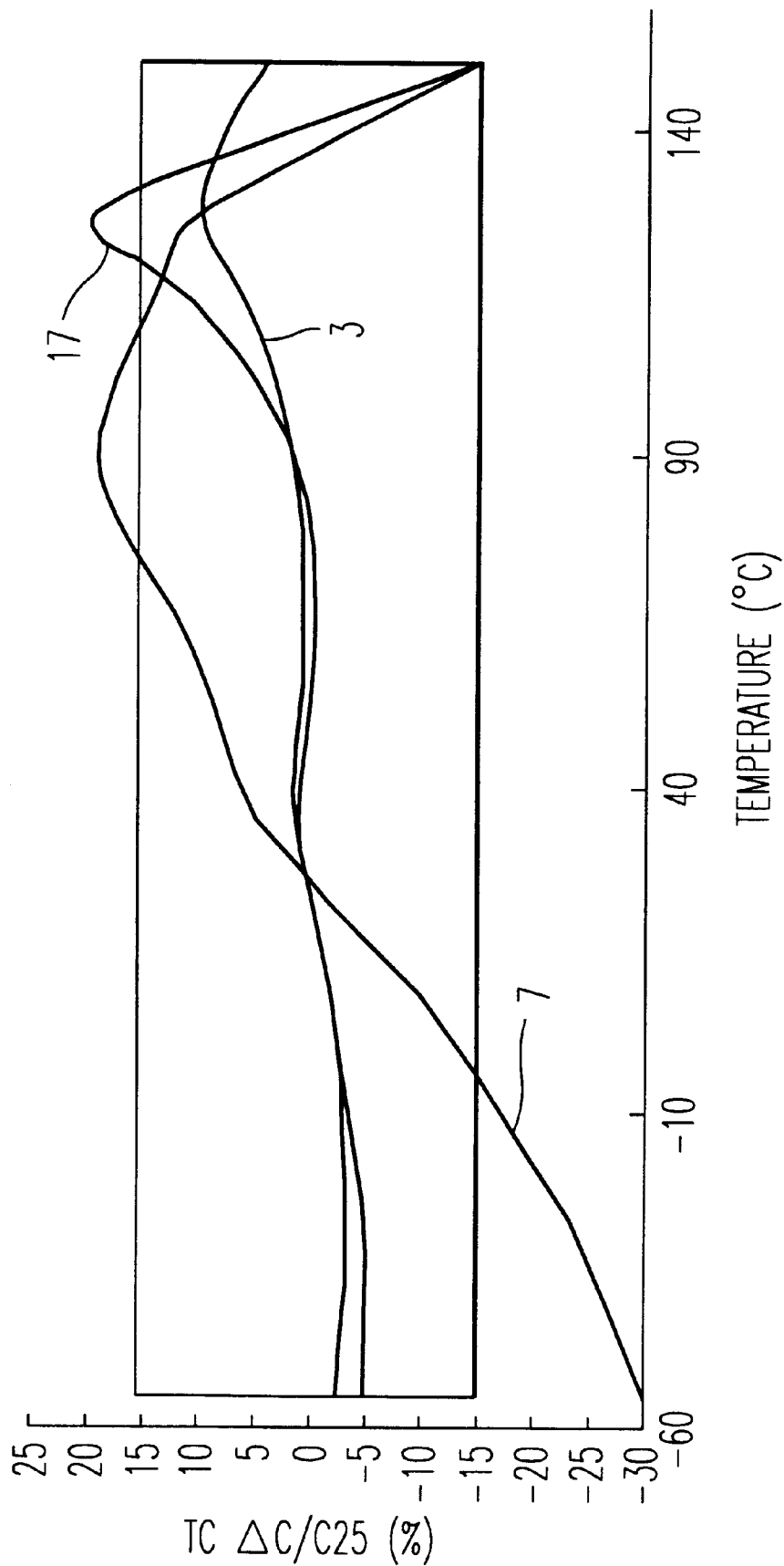
FIG. 1 is a graph illustrative of capacitance vs. temperature characteristics for dielectric ceramic compositions having a high dielectric constant according to the invention.

The present invention will now explained specifically with reference to some preferred embodiments.

The high dielectric-constant dielectric ceramic composition according to the invention contains as major components barium titanate in an amount of 94.00 to 99.00 mol % and preferably 97.00 to 98.00 mol % calculated as $BaTiO_3$, tantalum oxide in an amount of 0.05 to 3.00 mol % and preferably 0.4 to 1.0 mol % calculated as $Ta_2O_5$, niobium oxide in an amount of 0.05 to 3.00 mol % and preferably 0.4 to 1.0 mol % calculated as $Nb_2O_5$ and zinc oxide in an amount of 0.50 to 3.00 mol % and preferably 1.0 to 2.0 mol % calculated as ZnO.

The dielectric ceramic composition of the invention further contains as an additive or additives at least one of calcium zirconate, strontium zirconate and barium zirconate in the total amount of 0.2 to 5.0% by weight and preferably 1.0 to 3.0% by weight per 100 mol % of the major components. By incorporating these additives in the composition, the X8R standard (providing that the rate of capacitance change is within ±15% of a reference value at 25° C. over the temperature range of −55° C. to +150° C.) prescribed by EIAJ (the Standards Electronic Industries Association of Japane) can be satisfied over a wider firing temperature range.

When the content of barium titanate is less than 94.00 mol % calculated as $BaTiO_3$, the relative dielectric constant becomes low. The rate of capacitance change with temperature (ΔC/C25° C.), too, becomes large especially at 150° C. At more than 99.00 mol %, the dielectric loss (tan δ) and the rate of capacitance change with temperature become large with a sinterability drop.

When the content of tantalum oxide is less than 0.05 mol % calculated as $Ta_2O_5$, the rate of capacitance change with temperature becomes large. At more than 3.00 mol %, the rate of capacitance change with temperature becomes large with a relative dielectric constant decrease and a sinterability drop as well.

When the content of niobium oxide is less than 0.05 mol % calculated as Nb2O5, the relative dielectric constant becomes low with increases in both the dielectric loss and the rate of capacitance change with temperature, and a sinterability drop as well. To add to this, the insulating property becomes low. At more than 3.00 mol %, the relative dielectric constant becomes low. In addition, the rate of capacitance change with temperature becomes large especially at 150° C., with a sinterability drop.

By the combined use of tantalum oxide and niobium oxide, the rate of capacitance change with temperature can be considerably improved. In addition, the rate of capacitance change with temperature is less dependent on firing temperature, and so the composition of the invention can satisfy the X8R standard over a wider firing temperature range of 1,280 to 1,380° C. Only by use of tantalum oxide, it is impossible to obtain a composition suitable for multilayered ceramic capacitors because the insulating property becomes worse with a relative dielectric constant decrease and a dielectric loss (tan δ) increase as well. Furthermore, when a ceramic composition containing tantalum oxide alone is used for the formation of a multilayered ceramic capacitor, it must be fired at an elevated temperature but, nonetheless, its sinterability is relatively worse. Only by use of niobium oxide, it is impossible to obtain a composition suitable for multilayered ceramic capacitors because the dielectric loss (tan δ) becomes large. In addition, the rate of capacitance change with temperature is largely dependent on firing temperature, and so the X8R standard can be satisfied only in a very narrow temperature range of 1,280 to 1,320° C.

When the content of zinc oxide is less than 0.50 mol % calculated as ZnO, the dielectric loss and the rate of capacitance change with temperature become large with a sinterability drop. At more than 3.00 mol %, the relative dielectric constant becomes low. The rate of capacitance change with temperature, too, becomes large especially at 150° C.

When the total amount of at least one of calcium zirconate, strontium zirconate and barium zirconate is less than 0.2% by weight per 100 mol % of the major components, calculated as $CaZrO_3$, $SrZrO_3$ and $BaZrO_3$, respectively, the rate of capacitance change with temperature becomes large especially at 120° C., and 150° C. When the total amount exceeds 5.0% by weight, the rate of capacitance change with temperature becomes large especially at 150° C.

Preferably, the high dielectric-constant dielectric ceramic composition according to the invention further contains at least one of lanthanum oxide, neodymium oxide, praseodymium oxide and samarium oxide in the total amount of up to 0.7% by weight per 100 mol % of the major components, calculated as $La_2O_3$, $Nd_2O_3$, $Pr_6O_{11}$ and $Sm_2O_3$, respectively. By adding these oxides to the composition, it is possible to improve its relative dielectric constant, sinterability and insulating property. When the total amount of the oxides exceeds 0.7% by weight, the rate of capacitance change with temperature becomes large especially at 150° C.

Preferably, the high dielectric-constant dielectric ceramic composition according to the invention yet further contains manganese oxide in an amount of up to 0.3% by weight and especially 0.1 to 0.3% by weight per 100 mol % of the major components, calculated as MnO. By adding the manganese oxide to the composition, the reduction of other metals can be avoided, resulting in dielectric loss and sinterability improvements. When the content of the manganese oxide exceeds 0.3% by weight, the dielectric loss becomes large. The rate of capacitance change with temperature, too, becomes large especially at 150° C. In addition, poor sinterability renders it impossible to obtain dense ceramics.

Preferably, the high dielectric-constant dielectric ceramic composition according to the invention still yet further contains silicon oxide in an amount of up to 0.3% by weight per 100 mol % of the major components, calculated as $SiO_2$. By adding the silicon oxide to the composition, it is improved in terms of sinterability, and insulating property as well. When the content of the silicon oxide exceeds 0.3% by weight, the rate of capacitance change with temperature becomes large.

In what follows, an account will be given of how to fabricate the high dielectric-constant dielectric ceramic composition of the invention.

Powdery starting materials, i.e., powders of barium titanate, tantalum oxide, niobium oxide, zinc oxide, calcium zirconate, strontium zirconate, barium zirconate, lanthanum oxide, neodymium oxide, praseodymium oxide, samarium oxide, manganese carbonate and silicon oxide are weighed in such a manner as to provide a composition upon firing, and then wet-milled in a ball mil.

Preferably in this case, the barium titanate in the starting materials has an average particle diameter of 0.4 μm to 1.5 μm and especially 0.8 μm to 1.2 μm. The average particle diameter of the barium titanate is important for the fabrication of high-quality multilayered ceramic capacitors. At an average particle diameter of less than 0.4 μm, the rate of incidence of delamination upon firing becomes high, and so a fired product becomes unsuitable for a multilayered ceramic capacitor. Difficulty is also involved in the formation of a multilayered ceramic capacitor. At an average particle diameter exceeding 1.5 μm, it is difficult to obtain dense ceramics because of poor sinterability. Thus, if the average particle diameter of the barium titanate lies within the aforesaid range, it is then possible to improve sinterability considerably.

Preferably, the barium titanate in the starting materials has a purity of at least 99.5% and especially at least 99.9%. At a purity of less than 99.5%, the relative dielectric constant and dielectric loss become large.

The barium titanate may be synthesized by either solid-phase processes or liquid-phase processes although the latter processes are preferred.

Then, the slurry is dehydrated and dried, and formed at a pressure of about 3 tons/cm² with the addition of an organic binder thereto.

Silver electrodes are then baked onto both surfaces of the thus obtained ceramic composition material to make a capacitor.

The dielectric ceramic composition of the invention has a high dielectric constant of the order of at least 2,500 and especially 3,000 to 4,500.

The dielectric ceramic composition of the invention has a very low dielectric loss (tan δ) as represented by a loss factor of at most 1.2%.

The dielectric ceramic composition of the invention has a high insulation resistance of the order of at least $2.5 \times 10^{11}$ Ω.

The rate of capacitance change with temperature (ΔC/C25° C.) of the dielectric ceramic composition of the invention is within ±15% and especially -14.5 to +13.2% over the temperature of -55° C. to +150° C. It is here to be noted that the "rate of capacitance change with temperature" refers to a deviation from a reference value at 25° C. The dielectric ceramic composition of the invention can well satisfy the X8R standard (a ±15% deviation from the reference value at 25° C over the temperature range of -55° C. and +150° C.) prescribed by EIAJ (the Standards of Electronic Industries Association of Japan).

The high dielectric-constant dielectric ceramic composition of the invention can be used preferably for a multilayered ceramic capacitor. To obtain a multilayered ceramic capacitor, the starting materials are wet milled, pulverized, dehydrated and dried, and mixed with an organic binder for enameling. Then, the mixture is coated onto film by a doctor blade coater to form a ceramic composition sheet, which is in turn provided with an internal electrode by printing. A plurality of such sheets are stacked one upon another and thermocompression bonded together to obtain a multilayered structure. Finally, this structure is fired under the same conditions for a capacitor, and provided with terminal electrodes to make a multilayered ceramic capacitor.

For the internal electrode, platinum or platinum-palladium alloys may be used as conventional. In the invention, however, inexpensive palladium, silver-palladium alloys, silver, etc. can be used because the high dielectric-constant dielectric ceramic composition of the invention is free of any bismuth compound. For this reason, multilayered ceramic capacitors can be used at low costs.

Usually, 50 to 120 dielectric ceramic layers, each having a thickness of 10 to 20 μm, may be used in a multilayered form although not limited thereto.

When the high dielectric-constant dielectric ceramic composition of the invention is used for a multilayered ceramic capacitor, delamination is most unlikely to take place upon firing, although it has frequently occurred in the prior art. Thus, the use of the high dielectric-constant dielectric ceramic composition of the invention makes it possible to obtain high-quality multilayered ceramic capacitors.

The present invention will now be explained more specifically with reference to examples.

EXAMPLE 1

Starting materials, viz., powders of $BaTiO_3$ having such average particle diameters and purity as shown in Tables 3 and 4 and powders of $Ta_2O_5$, $Nb_2O_5$, ZnO, $CaZrO_3$, $SrZrO_3$, $BaZrO_3$, $La_2O_3$, $Nd_2O_3$, $Pr_6O_{11}$, $Sm_2O_3$, $MnCO_3$ and $SiO_2$ were weighed in such a manner as to provide such post-firing compositions as shown in Tables 1 and 2, and then wet milled in a ball mill.

After wet milling, the obtained slurry was dehydrated and dried.

Then, the dried composition material is compressed, with the addition of an organic binder thereto, at a pressure of about 3 tons/cm$^2$ into a disk of 16.5 mm in diameter and 0.6 mm in thickness.

In the air, the disk was fired for 2 hours at such firing temperatures as shown in Tables 3 and 4.

Silver electrodes were backed onto both surfaces of the thus obtained ceramic disk material to make a capacitor.

A multilayered ceramic capacitor was prepared as follows.

The starting materials were wet milled, pulverized, dehydrated and dried, and mixed with an organic binder for enameling. The mixture was coated onto film by a doctor blade coater to form a high dielectric-constant dielectric ceramic composition sheet of 30 μm in thickness. Then, the obtained high dielectric-constant dielectric ceramic composition sheet was provided with a palladium internal electrode by printing. Five such sheets were stacked one upon another and thermocompression bonded together to obtain a multilayered structure which was in turn cut into a 3.2×1.6-mm 3216 shape. The thus obtained multilayered structure pieces were fired at such firing temperatures as shown in Tables 3 and 4 for 2 hours in the air, and provided thereon with terminal electrodes of an indium-gallium (In—Ga) alloy to make multilayered ceramic capacitors.

Estimation of Electrical Properties

The relative dielectric constants and dielectric losses (tan δ) of these capacitors were measured at a frequency of 1 KHz, 1V, and room temperature of 20° C. Their insulation resistance was measured at 500 V and room temperature of 20° C., and their rates of capacitance change with temperature (ΔC/C25° C.) were determined at a frequency of 1 KHz and 1 V, and in a prescribed temperature state.

Estimation of Sinterability

The sinterability of the composition was estimated by determining the density thereof upon sintering. In Tables 3 and 4, O indicates a density of $\geq 5.5$ g/cm$^2$ and x stands for a density of <5.5 g/cm$^2$.

Estimation of Delamination

Delamination was estimated by observing 20 multilayered ceramic capacitors upon mirror polishing under a microscope.

The results are set out in Tables 3 and 4.

TABLE 1

| Sample No. | Major components (mol %) | | | | | Additives (wt %) | | | | | | | | |
|---|---|---|---|---|---|---|---|---|---|---|---|---|---|---|
| | BaTiO$_3$ | Ta$_2$O$_5$ | Nb$_2$O$_5$ | ZnO | CaZrO$_3$ | SrZrO$_3$ | BaZrO$_3$ | La$_2$O$_3$ | Nd$_2$O$_3$ | Pr$_6$O$_{11}$ | Sm$_2$O$_3$ | MnO | SiO$_2$ |
| Comp. Ex. 1 | 99.50 | 0.10 | 0.20 | 0.20 | 1.0 | 0 | 0 | 0 | 0 | 0 | 0 | 0.1 | 0 |
| Ex. 2 | 99.00 | 0.25 | 0.25 | 0.50 | 2.0 | 0 | 0 | 0 | 0 | 0 | 0 | 0.1 | 0 |
| Ex. 3 | 98.00 | 0.40 | 0.60 | 1.00 | 2.0 | 0 | 0 | 0 | 0 | 0 | 0 | 0 | 0 |
| Ex. 4 | 94.00 | 1.50 | 1.50 | 3.00 | 2.0 | 0 | 0 | 0 | 0 | 0 | 0 | 0.1 | 0 |
| Comp. Ex. 5 | 93.00 | 1.50 | 2.00 | 3.50 | 2.0 | 0 | 0 | 0 | 0 | 0 | 0 | 0.1 | 0 |
| Comp. Ex. 6 | 96.95 | 0 | 0.05 | 1.00 | 2.0 | 0 | 0 | 0 | 0 | 0 | 0 | 0 | 0 |
| Comp. Ex. 7 | 98.40 | 0 | 0.60 | 1.00 | 2.0 | 0 | 0 | 0 | 0 | 0 | 0 | 0 | 0 |
| Comp. Ex. 8 | 96.00 | 0 | 3.00 | 1.00 | 2.0 | 0 | 0 | 0 | 0 | 0 | 0 | 0 | 0 |
| Ex. 9 | 97.50 | 0.05 | 1.25 | 1.20 | 2.0 | 0 | 0 | 0 | 0 | 0 | 0 | 0.1 | 0 |
| Ex. 10 | 98.00 | 0.40 | 0.60 | 1.00 | 2.0 | 0 | 0 | 0 | 0 | 0 | 0 | 0.3 | 0 |
| Comp. Ex. 11 | 98.00 | 0.40 | 0.60 | 1.00 | 2.0 | 0 | 0 | 0 | 0 | 0 | 0 | 0.5 | 0 |
| Comp. Ex. 12 | 98.95 | 0.05 | 0 | 1.00 | 2.0 | 0 | 0 | 0 | 0 | 0 | 0 | 0 | 0 |
| Comp. Ex. 13 | 98.50 | 0.50 | 0 | 1.00 | 2.0 | 0 | 0 | 0 | 0 | 0 | 0 | 0 | 0 |
| Comp. Ex. 14 | 96.00 | 3.00 | 0 | 1.00 | 2.0 | 0 | 0 | 0 | 0 | 0 | 0 | 0 | 0 |
| Ex. 15 | 95.00 | 3.00 | 0.05 | 1.95 | 2.0 | 0 | 0 | 0 | 0 | 0 | 0 | 0.1 | 0 |
| Comp. Ex. 16 | 94.45 | 3.50 | 0.05 | 2.00 | 2.0 | 0 | 0 | 0 | 0 | 0 | 0 | 0.1 | 0 |
| Comp. Ex. 17 | 98.00 | 0.40 | 0.60 | 1.00 | 0.1 | 0 | 0 | 0 | 0 | 0 | 0 | 0.1 | 0 |
| Ex. 18 | 98.00 | 0.40 | 0.60 | 1.00 | 0.2 | 0 | 0 | 0 | 0 | 0 | 0 | 0.1 | 0 |
| Ex. 19 | 98.00 | 0.40 | 0.60 | 1.00 | 5.0 | 0 | 0 | 0 | 0 | 0 | 0 | 0.1 | 0 |
| Comp. Ex. 20 | 98.00 | 0.40 | 0.60 | 1.00 | 7.0 | 0 | 0 | 0 | 0 | 0 | 0 | 0.1 | 0 |
| Ex. 21 | 94.50 | 0.50 | 3.05 | 2.00 | 2.0 | 0 | 0 | 0 | 0 | 0 | 0 | 0.1 | 0 |
| Comp. Ex. 22 | 94.00 | 0.50 | 3.50 | 2.00 | 2.0 | 0 | 0 | 0 | 0 | 0 | 0 | 0.1 | 0 |
| Ex. 23 | 97.00 | 1.00 | 1.00 | 1.00 | 2.0 | 0 | 0 | 0 | 0 | 0 | 0 | 0.1 | 0 |
| Ex. 24 | 98.00 | 0.40 | 0.60 | 1.00 | 2.0 | 0 | 0 | 0 | 0 | 0 | 0 | 0 | 0 |
| Ex. 25 | 98.00 | 0.40 | 0.60 | 1.00 | 2.0 | 0 | 0 | 0 | 0 | 0 | 0 | 0 | 0 |

TABLE 2

| Sample No. | Major components (mol %) | | | | Additives (wt %) | | | | | | | | |
|---|---|---|---|---|---|---|---|---|---|---|---|---|---|
| | BaTiO$_3$ | Ta$_2$O$_5$ | Nb$_2$O$_5$ | ZnO | CaZrO$_3$ | SrZrO$_3$ | BaZrO$_3$ | La$_2$O$_3$ | Nd$_2$O$_3$ | Pr$_6$O$_{11}$ | Sm$_2$O$_3$ | MnO | SiO$_2$ |
| Comp. Ex. 26 | 98.00 | 0.40 | 0.60 | 1.00 | 2.0 | 0 | 0 | 0 | 0 | 0 | 0 | 0 | 0 |
| Comp. Ex. 27 | 98.00 | 0.40 | 0.60 | 1.00 | 2.0 | 0 | 0 | 0 | 0 | 0 | 0 | 0 | 0 |
| Ex. 28 | 98.00 | 0.40 | 0.60 | 1.00 | 2.0 | 0 | 0 | 0 | 0 | 0 | 0 | 0 | 0 |
| Comp. Ex. 29 | 98.00 | 0.40 | 0.60 | 1.00 | 2.0 | 0 | 0 | 0 | 0 | 0 | 0 | 0 | 0 |
| Comp. Ex. 30 | 98.00 | 0 | 1.00 | 1.00 | 2.0 | 0 | 0 | 0 | 0 | 0 | 0 | 0 | 0 |
| Ex. 31 | 98.00 | 0.40 | 0.60 | 1.00 | 0 | 2.0 | 0 | 0 | 0 | 0 | 0 | 0 | 0 |
| Ex. 32 | 98.00 | 0.40 | 0.60 | 1.00 | 0 | 0 | 2.0 | 0 | 0 | 0 | 0 | 0 | 0 |
| Comp. Ex. 33 | 98.00 | 0.40 | 0.60 | 1.00 | 0 | 0.1 | 0 | 0 | 0 | 0 | 0 | 0 | 0 |
| Ex. 34 | 98.00 | 0.40 | 0.60 | 1.00 | 0 | 0.2 | 0 | 0 | 0 | 0 | 0 | 0 | 0 |
| Ex. 35 | 98.00 | 0.40 | 0.60 | 1.00 | 0 | 5.0 | 0 | 0 | 0 | 0 | 0 | 0 | 0 |
| Comp. Ex. 36 | 98.00 | 0.40 | 0.60 | 1.00 | 0 | 7.0 | 0 | 0 | 0 | 0 | 0 | 0 | 0 |
| Comp. Ex. 37 | 98.00 | 0.40 | 0.60 | 1.00 | 0 | 0 | 0.1 | 0 | 0 | 0 | 0 | 0 | 0 |
| Ex. 38 | 98.00 | 0.40 | 0.60 | 1.00 | 0 | 0 | 0.2 | 0 | 0 | 0 | 0 | 0 | 0 |
| Ex. 39 | 98.00 | 0.40 | 0.60 | 1.00 | 0 | 0 | 5.0 | 0 | 0 | 0 | 0 | 0 | 0 |
| Comp. Ex. 40 | 98.00 | 0.40 | 0.60 | 1.00 | 0 | 0 | 7.0 | 0 | 0 | 0 | 0 | 0 | 0 |
| Ex. 41 | 98.00 | 0.40 | 0.60 | 1.00 | 2.0 | 0 | 0 | 0.7 | 0 | 0 | 0 | 0 | 0 |
| Comp. Ex. 42 | 98.00 | 0.40 | 0.60 | 1.00 | 2.0 | 0 | 0 | 1.0 | 0 | 0 | 0 | 0 | 0 |
| Ex. 43 | 98.00 | 0.40 | 0.60 | 1.00 | 2.0 | 0 | 0 | 0 | 0.7 | 0 | 0 | 0 | 0 |
| Comp. Ex. 44 | 98.00 | 0.40 | 0.60 | 1.00 | 2.0 | 0 | 0 | 0 | 1.0 | 0 | 0 | 0 | 0 |
| Ex. 45 | 98.00 | 0.40 | 0.60 | 1.00 | 2.0 | 0 | 0 | 0 | 0 | 0.7 | 0 | 0 | 0 |
| Comp. Ex. 46 | 98.00 | 0.40 | 0.60 | 1.00 | 2.0 | 0 | 0 | 0 | 0 | 1.0 | 0 | 0 | 0 |
| Ex. 47 | 98.00 | 0.40 | 0.60 | 1.00 | 2.0 | 0 | 0 | 0 | 0 | 0 | 0.7 | 0 | 0 |
| Comp. Ex. 48 | 98.00 | 0.40 | 0.60 | 1.00 | 2.0 | 0 | 0 | 0 | 0 | 0 | 1.0 | 0 | 0 |
| Ex. 49 | 98.00 | 0.40 | 0.60 | 1.00 | 2.0 | 0 | 0 | 0 | 0 | 0 | 0 | 0 | 0.3 |
| Comp. Ex. 50 | 98.00 | 0.40 | 0.60 | 1.00 | 2.0 | 0 | 0 | 0 | 0 | 0 | 0 | 0 | 0.5 |

TABLE 3

| Sample No. | BaTiO$_3$ | | Firing temperature (° C.) | Relative dielectric constant | Dielectric loss tan δ (%) | Insulation resistance (Ω) | Rate of capacitance with temperature ΔC/C25(%) | | | Sinter-ability | Number of delaminated samples |
|---|---|---|---|---|---|---|---|---|---|---|---|
| | Average particle diameter(μm) | Purity (%) | | | | | −55° C. | −125° C. | 150° C. | | |
| Comp. Ex. 1 | 1.15 | 99.90 | 1380 | 4400 | 1.8 | 3.80 × 10$^{11}$ | −12.5 | 20.5 | −24.0 | x | |
| Ex. 2 | 1.15 | 99.90 | 1340 | 4500 | 1.0 | 6.50 × 10$^{11}$ | 4.1 | −7.8 | −12.0 | ○ | 0/20 |
| Ex. 3 | 1.15 | 99.90 | 1320 | 3800 | 1.1 | 4.50 × 10$^{11}$ | −4.6 | 9.5 | 3.4 | ○ | 0/20 |
| Ex. 4 | 1.15 | 99.90 | 1300 | 2500 | 0.7 | 2.70 × 10$^{11}$ | −2.5 | −0.5 | −12.6 | ○ | 0/20 |
| Comp. Ex. 5 | 1.15 | 99.90 | 1280 | 2050 | 0.5 | 2.50 × 10$^{11}$ | 5.0 | −3.7 | −18.9 | ○ | |
| Comp. Ex. 6 | 1.15 | 99.90 | 1300 | 3700 | 1.2 | 4.80 × 10$^{11}$ | −26.4 | 12.3 | −2.3 | ○ | |
| Comp. Ex. 7 | 1.15 | 99.90 | 1300 | 4700 | 0.6 | 3.00 × 10$^{11}$ | −30.0 | 10.2 | −15.5 | ○ | |
| Comp. Ex. 8 | 1.15 | 99.90 | 1300 | 5620 | 0.5 | 1.70 × 10$^{11}$ | −41.8 | 3.6 | −24.9 | ○ | |
| Ex. 9 | 1.15 | 99.90 | 1320 | 3400 | 0.9 | 4.20 × 10$^{11}$ | −6.0 | 7.1 | −5.2 | ○ | 0/20 |
| Ex. 10 | 1.15 | 99.90 | 1320 | 3600 | 0.7 | 4.00 × 10$^{11}$ | 1.0 | 2.0 | −10.8 | ○ | 0/20 |
| Comp. Ex. 11 | 1.15 | 99.90 | 1320 | 3250 | 1.3 | 1.60 × 10$^{11}$ | 3.6 | −1.9 | −16.6 | x | |
| Comp. Ex. 12 | 1.15 | 99.90 | 1300 | 2460 | 1.6 | 2.80 × 10$^{10}$ | −2.6 | 17.5 | 6.0 | x | |
| Comp. Ex. 13 | 1.15 | 99.90 | 1300 | 2350 | 1.7 | 3.30 × 10$^{10}$ | −3.1 | 15.3 | 5.4 | x | |
| Comp. Ex. 14 | 1.15 | 99.90 | 1300 | 1890 | 2.1 | 2.90 × 10$^{10}$ | −3.4 | 13.0 | 3.9 | x | |
| Ex. 15 | 1.15 | 99.90 | 1340 | 2550 | 0.6 | 3.50 × 10$^{11}$ | −9.4 | 4.3 | −13.0 | ○ | 0/20 |
| Comp. Ex. 16 | 1.15 | 99.90 | 1400 | 2300 | 0.6 | 2.70 × 10$^{11}$ | −10.8 | 2.2 | −17.3 | x | |
| Comp. Ex. 17 | 1.15 | 99.90 | 1340 | 4350 | 1.1 | 5.20 × 10$^{11}$ | −2.3 | 19.2 | −16.0 | ○ | |
| Ex. 18 | 1.15 | 99.90 | 1340 | 4200 | 0.9 | 5.00 × 10$^{11}$ | −4.8 | 12.9 | −14.5 | ○ | 0/20 |
| Ex. 19 | 1.15 | 99.90 | 1340 | 4350 | 0.9 | 4.60 × 10$^{11}$ | −6.0 | 2.4 | −11.3 | ○ | 0/20 |
| Comp. Ex. 20 | 1.15 | 99.90 | 1340 | 3100 | 0.8 | 5.70 × 10$^{11}$ | 9.7 | 0.6 | −17.2 | ○ | |
| Ex. 21 | 1.15 | 99.90 | 1340 | 2600 | 0.7 | 3.30 × 10$^{11}$ | 4.5 | −0.8 | −14.5 | ○ | 0/20 |
| Comp. Ex. 22 | 1.15 | 99.90 | 1380 | 2100 | 0.7 | 3.00 × 10$^{11}$ | 7.5 | −2.0 | −17.1 | x | |
| Ex. 23 | 1.15 | 99.90 | 1320 | 3850 | 0.9 | 5.00 × 10$^{11}$ | −9.3 | 13.2 | 4.6 | ○ | 0/20 |
| Ex. 24 | 1.15 | 99.90 | 1320 | 3800 | 1.1 | 4.50 × 10$^{11}$ | −4.6 | 9.5 | 3.4 | ○ | 0/20 |
| Ex. 25 | 1.50 | 99.50 | 1340 | 3650 | 1.1 | 4.20 × 10$^{11}$ | −6.0 | 10.7 | 4.0 | ○ | 0/20 |

TABLE 4

| | BaTiO$_3$ | | | | | | Rate of capacitance with temperature $\Delta C/C25(\%)$ | | | | |
|---|---|---|---|---|---|---|---|---|---|---|---|
| Sample No. | Average particle diameter($\mu$m) | Purity (%) | Firing temperature (° C.) | Relative dielectric constant | Dielectric loss tan $\delta$ (%) | Insulation resistance ($\Omega$) | −55° C. | −125° C. | 150° C. | Sinterability | Number of delaminated samples |
| Comp. Ex. 26 | 1.30 | 98.50 | 1300 | 3100 | 1.9 | 6.50 × 10$^{11}$ | −6.4 | 11.6 | 5.2 | o | 0/20 |
| Comp. Ex. 27 | 2.20 | 99.50 | 1400 | 3300 | 1.2 | 5.10 × 10$^{11}$ | −5.0 | 5.6 | 1.6 | x | 0/20 |
| Ex. 28 | 0.50 | 99.90 | 1280 | 3950 | 1.0 | 4.50 × 10$^{11}$ | −5.2 | 8.0 | −1.0 | o | 0/20 |
| Comp. Ex. 29 | 0.30 | 99.90 | 1280 | 4000 | 1.0 | 4.30 × 10$^{11}$ | −5.8 | 7.2 | −2.4 | o | 20/20 |
| Comp. Ex. 30 | 1.15 | 99.90 | 1320 | 3900 | 1.0 | 5.50 × 10$^{11}$ | −4.2 | 11.3 | −7.9 | o | 0/20 |
| Ex. 31 | 1.15 | 99.90 | 1320 | 3870 | 1.1 | 4.50 × 10$^{11}$ | −5.4 | 7.5 | 0.8 | o | 0/20 |
| Ex. 32 | 1.15 | 99.90 | 1320 | 3680 | 1.0 | 4.00 × 10$^{11}$ | −4.0 | 6.1 | 1.9 | o | 0/20 |
| Comp. Ex. 33 | 1.15 | 99.90 | 1320 | 4150 | 1.3 | 3.50 × 10$^{11}$ | −14.0 | 15.3 | −19.6 | o | |
| Ex. 34 | 1.15 | 99.90 | 1320 | 4070 | 1.1 | 3.50 × 10$^{11}$ | −12.1 | 13.9 | −14.5 | o | 0/20 |
| Ex. 35 | 1.15 | 99.90 | 1320 | 3690 | 0.9 | 4.00 × 10$^{11}$ | −7.6 | 4.7 | −12.7 | o | 0/20 |
| Comp. Ex. 36 | 1.15 | 99.90 | 1320 | 3200 | 0.6 | 4.50 × 10$^{11}$ | 6.0 | −0.3 | −21.4 | o | |
| Comp. Ex. 37 | 1.15 | 99.90 | 1320 | 4200 | 1.3 | 3.50 × 10$^{11}$ | −14.7 | 14.2 | −20.1 | o | |
| Ex. 38 | 1.15 | 99.90 | 1320 | 4100 | 1.1 | 3.70 × 10$^{11}$ | −14.3 | 14.0 | −14.5 | o | 0/20 |
| Ex. 39 | 1.15 | 99.90 | 1320 | 3950 | 0.6 | 4.00 × 10$^{11}$ | −8.2 | 5.1 | −12.3 | o | 0/20 |
| Comp. Ex. 40 | 1.15 | 99.90 | 1320 | 3250 | 1.1 | 4.10 × 10$^{11}$ | −4.6 | −1.0 | −21.8 | o | |
| Ex. 41 | 1.15 | 99.90 | 1300 | 4160 | 1.1 | 6.00 × 10$^{11}$ | −7.9 | 6.4 | −14.3 | o | 0/20 |
| Comp. Ex. 42 | 1.15 | 99.90 | 1300 | 4020 | 1.1 | 5.30 × 10$^{11}$ | −9.1 | 4.3 | −16.7 | o | 0/20 |
| Ex. 43 | 1.15 | 99.90 | 1300 | 4180 | 1.1 | 5.50 × 10$^{11}$ | −7.5 | 6.6 | −14.5 | o | |
| Comp. Ex. 44 | 1.15 | 99.90 | 1300 | 4050 | 1.1 | 5.00 × 10$^{11}$ | −9.0 | 4.1 | −19.9 | o | |
| Ex. 45 | 1.15 | 99.90 | 1300 | 4120 | 1.1 | 6.00 × 10$^{11}$ | −6.3 | 7.0 | −14.5 | o | 0/20 |
| Comp. Ex. 46 | 1.15 | 99.90 | 1300 | 4000 | 1.0 | 5.30 × 10$^{11}$ | −8.2 | 5.6 | −19.4 | o | |
| Ex. 47 | 1.15 | 99.90 | 1300 | 4170 | 1.1 | 5.50 × 10$^{11}$ | −7.0 | 6.5 | −14.5 | o | 0/20 |
| Comp. Ex. 48 | 1.15 | 99.90 | 1300 | 4060 | 1.1 | 5.00 × 10$^{11}$ | −9.1 | 3.9 | −18.9 | o | |
| Ex. 49 | 1.15 | 99.90 | 1300 | 3700 | 1.0 | 6.30 × 10$^{11}$ | −7.4 | 5.6 | −14.5 | o | 0/20 |
| Comp. Ex. 50 | 1.15 | 99.90 | 1300 | 3000 | 1.0 | 6.50 × 10$^{11}$ | −9.5 | 3.0 | −21.7 | o | |

The high dielectric-constant dielectric ceramic composition of the invention has a relative dielectric constant of as high as 2,500 to 4,500 at normal temperature, and a dielectric loss of as low as 0.6 to 1.1%. The rate of capacitance change with temperature is reduced, as represented by −14.3 to 4.5% at −55° C., −7.8 to 14.0% at 125° C., and −14.9 to 4.6% at 150° C. In short, a deviation from the reference rate of capacitance change at 25° C. is limited to within the range of ±15% over the temperature range of −55° C. to +150° C., and so the composition can well satisfy the X8R standard prescribed by EIAJ (the Standards of Electronic Industries Association of Japan). Also, the composition is found to be free of delamination upon formed into a multilayered ceramic capacitor.

Capacitance vs. temperature characteristic curves for sample Nos. 3, 7 and 17 of the high dielectric-constant dielectric ceramic composition are shown in FIG. 1. Sample No. 3 is a sample according to the invention while Nos. 7 and 17 are for comparative purposes. From FIG. 1 it is found that the high dielectric-constant dielectric ceramic composition of the invention satisfies the X8R standard, and its rate of capacitance change with temperature is very small or its capacitance is substantially invariable depending on temperature.

From comparative examples 1, 5, 11, 16, 17, 20, 22, 33, 36, 37, 40, 42, 44, 46, 48 and 50, it is understood that the X8R standard is not satisfied without recourse to the composition according to the invention.

From comparative examples 6 to 8 and 12 to 14, it is understood that neither is the X8R standard satisfied nor are such excellent properties as in the invention obtainable without recourse to the combined use of tantalum oxide and niobium oxide as specific major components. From comparative examples 12 to 14, it is also understood that only by use of tantalum oxide, it is impossible to achieve good insulating property, high dielectric constant and small dielectric loss (tan $\delta$), and to achieve good sinterability as well.

From Comparative example 29, it is found that if the average particle diameter of the starting barium titanate is less than 0.4 $\mu$m, the rate of incidence of delamination then becomes very high. From comparative example 27, it is also found that an average particle diameter exceeding 1.5 $\mu$m the sinterability of the composition becomes worse.

From example 26, is noted that if the starting barium titanate has a purity of less than 99.5%, the relative dielectric constant is decreased with an increase in the dielectric loss.

The rates of capacitance change with temperature ($\Delta C/C25°$ C.) of multilayered capacitors obtained by firing the compositions of example 24 and comparative example 30 at varying firing temperatures are shown in Table 5.

TABLE 5

| | | Rate of capacitance change with temperature $\Delta C/C25$ (%) | |
|---|---|---|---|
| Sample No. | Firing temperature (° C.) | −55° C. | 150° C. |
| Ex. 24 | 1280 | −3.0 | 6.9 |
| | 1300 | −3.8 | 6.5 |
| | 1320 | −4.6 | 3.4 |
| | 1340 | −7.7 | −2.3 |
| | 1360 | −11.2 | −8.6 |
| | 1380 | −13.9 | −14.8 |
| | 1400 | −17.7 | −19.6 |
| Comp. Ex. 30 | 1280 | −2.2 | 1.6 |
| | 1300 | −2.6 | 0.9 |
| | 1320 | −4.2 | −7.9 |
| | 1340 | −12.4 | −15.6 |
| | 1360 | −21.3 | −22.5 |
| | 1380 | −33.8 | −27.9 |
| | 1400 | −40.5 | −33.1 |

The high dielectric-constant dielectric ceramic composition of the invention is limited in terms of the dependence on firing temperature of the rate of capacitance change with temperature, and so can well satisfy the X8R standard at up to 1,380° C. On the other hand, comparative example 30 free of tantalum oxide is comparable to the composition of the invention in terms of relative dielectric constant, dielectric loss (tan δ), insulation resistance and sinterability; however, its rate of capacitance change with temperature is largely depending on firing temperature, and does not satisfy the X8R standard at higher than 1,340° C. In addition, as the temperature increases, the rate of capacitance change with temperature becomes larger than that of the high dielectric-constant dielectric ceramic composition of the invention.

Thus, the present invention can provide a high dielectric-constant dielectric ceramic composition which is most unlikely to delaminate and suitable for a multilayered ceramic capacitor, and has little, if any, capacitance change and dielectric loss over a wide temperature range (-55° C. to +150° C.), and its fabrication process.

Japanese Patent Application No. 40465/1997 is incorporated herein by reference.

Although some preferable embodiments have been described, many modifications and variations may be made thereto in the light of the above teachings. It is therefore to be understood that within the scope of the appended claims, the invention may be practiced otherwise than as specifically described.

What we claim is:

1. A high dielectric-constant dielectric ceramic composition, which comprises as major components 94 to 99 mol % of barium titanate, calculated as $BaTiO_3$, 0.05 to 3 mol % of tantalum oxide, calculated as $Ta_2O_5$, 0.05 to 3 mol % of niobium oxide, calculated as $Nb_2O_5$, and 0.5 to 3 mol % of zinc oxide, calculated as ZnO, and further contains as a subordinate additive at least one of calcium zirconate, strontium zirconate and barium zirconate in a total amount of 0.2 to 5% by weight per 100 mol % of said major components, calculated as $CaZrO_3$, $SrZrO_3$ and $BaZrO_3$, respectively.

2. The high dielectric-constant dielectric ceramic composition according to claim 1, which further contains at least one of lanthanum oxide, neodymium oxide, praseodymium oxide and samarium oxide in a total amount of up to 0.7% by weight per 100 mol % of said major components, calculated as $La_2O_3$, $Nd_2O_3$, $Pr_6O_{11}$ and $Sm_2O_3$, respectively.

3. The high dielectric-constant dielectric ceramic composition according to claim 1, which further contains manganese oxide in an amount of up to 0.3% by weight per 100 mol % of said major components, calculated as MnO.

4. The high dielectric-constant dielectric ceramic composition according to claim 1, which further contains silicon oxide in an amount of up to 0.3% by weight per 100 mol % of said major components, calculated as $SiO_2$.

5. The high dielectric-constant dielectric ceramic composition according to claim 1, wherein a capacitance change thereof with temperature is within ±15% of a reference value at 25° C. over a temperature range of -55° C. to +150° c.

6. A ceramic composition, comprising Ba, Ti, Ta, Nb, Zn, Zr, optionally Ca and optionally Sr, in the same proportions as a mixture comprising as major components 94 to 99 mol % of barium titanate, calculated as $BaTiO_3$, 0.05 to 3 mol % of tantalum oxide, calculated as $Ta_2O_5$, 0.05 to 3 mol % of niobium oxide, calculated as $Nb_2O_5$, and 0.5 to 3 mol % of zinc oxide, calculated as ZnO, and further comprising at least one of calcium zirconate, strontium zirconate and barium zirconate in a total amount of 0.2 to 5% by weight per 100 mol % of said major components, calculated as $CaZrO_3$, $SrZrO_3$ and $BaZrO_3$, respectively.

7. The ceramic composition of claim 6, further comprising at least one member selected from the group consisting of La, Nd, Pr and Sm, in a total amount of up to 0.7% by weight per 100 mol % of said major components, calculated as $La_2O_3$, $Nd_2O_3$, $Pr_6O_{11}$ and $Sm_2O_3$, respectively.

8. The ceramic composition of claim 6, further comprising Mn, in an amount of up to 0.3% by weight per 100 mol % of said major components, calculated as MnO.

9. The ceramic composition of claim 6, further comprising Si, in an amount of up to 0.3% by weight per 100 mol % of said major components, calculated as $SiO_2$.

10. The ceramic composition of claim 6, wherein a capacitance change thereof with temperature is within ±15% of a reference value at 25° C. over a temperature range of -55° C. to +150° C.

11. A method of making a ceramic composition, comprising firing a mixture comprising as major components 94 to 99 mol % of barium titanate, calculated as $BaTiO_3$, 0.05 to 3 mol % of tantalum oxide, calculated as $Ta_2O_5$, 0.05 to 3 mol % of niobium oxide, calculated as $Nb_2O_5$, and 0.5 to 3 mol % of zinc oxide, calculated as ZnO, and further comprising at least one of calcium zirconate, strontium zirconate and barium zirconate in a total amount of 0.2 to 5% by weight per 100 mol % of said major components, calculated as $CaZrO_3$, $SrZrO_3$ and $BaZrO_3$, respectively.

12. The method of claim 11, wherein said barium titanate has an average particle diameter of 0.4 to 1.5 μm.

13. The method of claim 11, wherein said barium titanate has a purity of at least 99.5%.

14. The method of claim 12, wherein said barium titanate has a purity of at least 99.5%.

15. A ceramic composition prepared by the method of claim 1.

16. A ceramic composition prepared by the method of claim 12.

17. A ceramic composition prepared by the method of claim 13.

18. A ceramic composition prepared by the method of claim 14.

* * * * *

UNITED STATES PATENT AND TRADEMARK OFFICE
CERTIFICATE OF CORRECTION

PATENT NO. : 5,990,029

DATED : November 23, 1999

INVENTOR(S): Masami SATOH, et al.

It is certified that an error appears in the above-identified patent and that said Letters Patent is hereby corrected as shown below:

Column 14, line 46, "claim 1." should read --claim 11.--.

Signed and Sealed this

Twenty-ninth Day of May, 2001

Attest:

NICHOLAS P. GODICI

Attesting Officer     Acting Director of the United States Patent and Trademark Office